(12) United States Patent
Jiang et al.

(10) Patent No.: US 11,057,976 B2
(45) Date of Patent: Jul. 6, 2021

(54) SHORT TO GROUND AND OPEN PROTECTING CIRCUIT, AND ASSOCIATED PROTECTING METHOD

(71) Applicant: Chengdu Monolithic Power Systems Co., Ltd., Chengdu (CN)

(72) Inventors: Shufa Jiang, Chengdu (CN); Junxin Tan, Hangzhou (CN); Bo Yu, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 17/101,185

(22) Filed: Nov. 23, 2020

(65) Prior Publication Data

US 2021/0168917 A1 Jun. 3, 2021

(30) Foreign Application Priority Data

Dec. 2, 2019 (CN) .......................... 201911210810.9

(51) Int. Cl.
*H05B 45/50* (2020.01)
*H05B 47/20* (2020.01)
*H05B 45/30* (2020.01)

(52) U.S. Cl.
CPC ............. *H05B 45/50* (2020.01); *H05B 45/30* (2020.01); *H05B 47/20* (2020.01)

(58) Field of Classification Search
CPC ........ H05B 45/00; H05B 45/14; H05B 45/30; H05B 45/50; H05B 47/20; H05B 47/24; H05B 47/26; H05B 41/285; H05B 41/2855
See application file for complete search history.

(56) References Cited

U.S. PATENT DOCUMENTS

| 7,394,203 | B2 | 7/2008 | Ren et al. |
| 7,420,337 | B2 | 9/2008 | Ren et al. |
| 7,423,384 | B2 | 9/2008 | Ren et al. |
| 7,804,254 | B2 | 9/2010 | Yao et al. |
| 7,894,174 | B2 | 2/2011 | Moyer et al. |

(Continued)

*Primary Examiner* — Thai Pham
(74) *Attorney, Agent, or Firm* — Perkins Coie LLP (57) ABSTRACT

A short to ground protecting circuit for an LED driver for providing a power supply voltage for N LED strings. The LED driver has an output terminal for providing a power supply voltage for the N LED strings and N feedback terminals having N detecting voltages respectively. For each i from 1 to N, the $i^{th}$ LED string is coupled between the output terminal and the $i^{th}$ feedback terminal, and the $i^{th}$ feedback terminal is configured to have the $i^{th}$ detecting voltage. The short to ground protecting circuit receives a short threshold voltage and N open fault signals, and generates N short indicating signals. And on the premise of the $i^{th}$ open fault signal is valid, and if the $i^{th}$ detecting voltage is less than the short threshold voltage for a preset time period, the $i^{th}$ short indicating signal is valid.

20 Claims, 6 Drawing Sheets

(56) References Cited

U.S. PATENT DOCUMENTS

| | | |
|---|---|---|
| 8,063,570 B2 | 11/2011 | Zhang et al. |
| 8,102,129 B2 | 1/2012 | Yao et al. |
| 8,344,661 B2* | 1/2013 | Hsu .................. H05B 45/46 315/307 |
| 8,736,192 B2* | 5/2014 | Jung .................. H05B 45/46 315/291 |
| 9,263,937 B2 | 2/2016 | Nguyen |
| 10,021,754 B2 | 7/2018 | Kuang et al. |
| 10,079,542 B2 | 9/2018 | Xiao et al. |
| 10,624,172 B1 | 4/2020 | Yu et al. |
| 2009/0027928 A1 | 1/2009 | Dong et al. |
| 2010/0141149 A1 | 6/2010 | Liu et al. |
| 2011/0002068 A1* | 1/2011 | Hu ..................... H02M 1/32 361/18 |
| 2011/0194214 A1 | 8/2011 | Yao et al. |
| 2014/0152180 A1* | 6/2014 | Wolf .................. H05B 47/24 315/122 |
| 2020/0113023 A1* | 4/2020 | Yu ..................... H05B 45/54 |

* cited by examiner

SHORT TO GROUND AND OPEN PROTECTING CIRCUIT, AND ASSOCIATED PROTECTING METHOD

CROSS-REFERENCE TO RELATED APPLICATIONS

This application claims priority to and the benefit of Chinese Patent Application No. 201911210810.9, filed on Dec. 2, 2019, which is incorporated herein by reference in its entirety.

TECHNICAL FIELD

This disclosure generally relates to an LED (Lighting emitting Diode) circuit, and more particularly but not exclusively relates to short to a ground and open protecting circuit.

BACKGROUND

Today, LED backlighting is more and more widely used in lighting application. For example, in LCD TV field, LED is tending to replace the traditional CCFL as the backlighting source. In an LED application system, LEDs are arranged in multiple strings that are powered by an LED driver circuit, and when a short to ground fault or an open fault happens in any one of the LED strings, different protection mechanisms are processed to protect the LED driver and the rest of the LED strings.

When any one of the LED strings has an open fault, the faulted LED string will be controlled to be isolated from the LED driver, and the LED driver will continue to work for powering the remaining LED strings. When any one of the LED strings has a short to ground fault, the LED driver is controlled to stop working.

But in some cases, the short to ground fault is often misjudged as the open fault, which will cause the burn out of the faulted LED string. Therefore, it is desired to provide a short to ground and open protecting circuit that can avoid misjudging the short to ground fault to the open fault.

SUMMARY

In accomplishing the above and other objects, there has been provided a short to ground protecting circuit for an LED (Light-emitting Diode) driver for powering N LED strings, wherein N is an integer greater than or equal to 1. The LED driver has an output terminal for providing a power supply voltage for the N LED strings and N feedback terminals having N detecting voltages respectively. Wherein i is an integer in a range from 1 to N, for each i from 1 to N, the $i^{th}$ LED string of the N LED strings is coupled between the output terminal and the $i^{th}$ feedback terminal of the N feedback terminals, and the $i^{th}$ feedback terminal is configured to have the $i^{th}$ detecting voltage of the N detecting voltages. Wherein the short to ground protecting circuit is configured to receive a short threshold voltage and N open fault signals, and to generate N short indicating signals. And wherein when the $i^{th}$ open fault signal of the N open fault signals is valid, and if the $i^{th}$ detecting voltage is less than the short threshold voltage for a preset time period, the $i^{th}$ short indicating signal is valid.

There has also been provided a short to ground and open protecting circuit for an LED (Light-emitting Diode) driver for powering N LED strings, wherein N is an integer greater than or equal to 1. The LED driver has an output terminal for providing a power supply voltage for the N LED strings and N feedback terminals having N detecting voltages respectively. Wherein i is an integer in a range from 1 to N, for each i from 1 to N, the $i^{th}$ LED string is coupled between the output terminal and the $i^{th}$ feedback terminal, and the $i^{th}$ feedback terminal is configured to have the $i^{th}$ detecting voltage. The short to ground and open protecting circuit comprising an open protecting circuit and a short to ground protecting circuit. The open protecting circuit is configured to generate N open fault signals, wherein for each i from 1 to N, when the $i^{th}$ LED string is open, the $i^{th}$ open fault signal is valid. The short to ground protecting circuit has N input terminals respectively coupled the N feedback terminals to receive the N detecting voltages, and is configured to generate N short indicating signals based on the N detecting voltages. Wherein for each i from 1 to N, when the $i^{th}$ open fault signal is valid, and if the $i^{th}$ detecting voltage is less than a short threshold voltage for a preset time period, the $i^{th}$ short indicating signal is valid.

There has also been provided An LED (Light-emitting Diode) driver for powering N LED strings, wherein N is an integer greater than or equal to 1. The LED driver has an output terminal and N feedback terminals having N detecting voltages, wherein i is an integer in a range from 1 to N. For each i from 1 to N, the $i^{th}$ LED string is coupled between the output terminal and the $i^{th}$ feedback terminal, and the $i^{th}$ feedback terminal is configured to have the $i^{th}$ detecting voltage. The LED driver comprises a voltage regulating circuit, a current regulating circuit, a feedback selecting circuit, an open protecting circuit and a short to ground protecting circuit. The voltage regulating circuit is coupled to the output terminal to provide a power supply voltage for the N LED strings. The current regulating circuit is coupled to the N LED strings and configured to regulate the currents flowing through the N LED strings based on a current regulating signal. The feedback selecting circuit has N input terminals respectively coupled to the N feedback terminals to receive the N detecting voltages, and is configured to provide the minimum one of the N detecting voltages to the voltage regulating circuit to regulate the power supply voltage. The open protecting circuit is configured to generate N open fault signals, wherein for each i from 1 to N, when the $i^{th}$ LED string is open, the $i^{th}$ LED fault signal is valid. The short to ground protecting circuit is configured to receive a short threshold voltage and N open fault signals, and to generate N short indicating signals, wherein for each i from 1 to N. When the $i^{th}$ open fault signal is valid, and if the $i^{th}$ detecting voltage is less than a short threshold voltage for a preset time period, the $i^{th}$ short indicating signal is valid.

There has also been provided a short to ground and open protecting method for an LED (Light-emitting Diode) driver for powering N LED strings, wherein N is an integer greater than or equal to 1. The LED driver has an output terminal for providing a power supply voltage for the N LED strings and N feedback terminals having N detecting voltages respectively. Wherein i is an integer in a range from 1 to N, for each i from 1 to N, the $i^{th}$ LED string is coupled between the output terminal and the $i^{th}$ feedback terminal, and the $i^{th}$ feedback terminal is configured to have the $i^{th}$ detecting voltage. The short to ground and open protecting method comprises receiving N open fault signals, wherein for each i from 1 to N, the $i^{th}$ open fault signals is configured to indicate if the $i^{th}$ LED string is open. The short to ground and open protecting method further comprises generating N short indicating signals by comparing the N detecting voltages with a short threshold voltage respectively. Wherein i is an integer in a range from 1 to N, for each i from 1 to N, when the $i^{th}$ open fault signals is valid, and if the $i^{th}$ detecting voltage is less than the short threshold voltage for a preset time period, the $i^{th}$ short indicating signal is valid.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION

Various embodiments of the present invention will now be described. In the following description, some specific details, such as example circuits and example values for these circuit components, are included to provide a thorough understanding of the embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
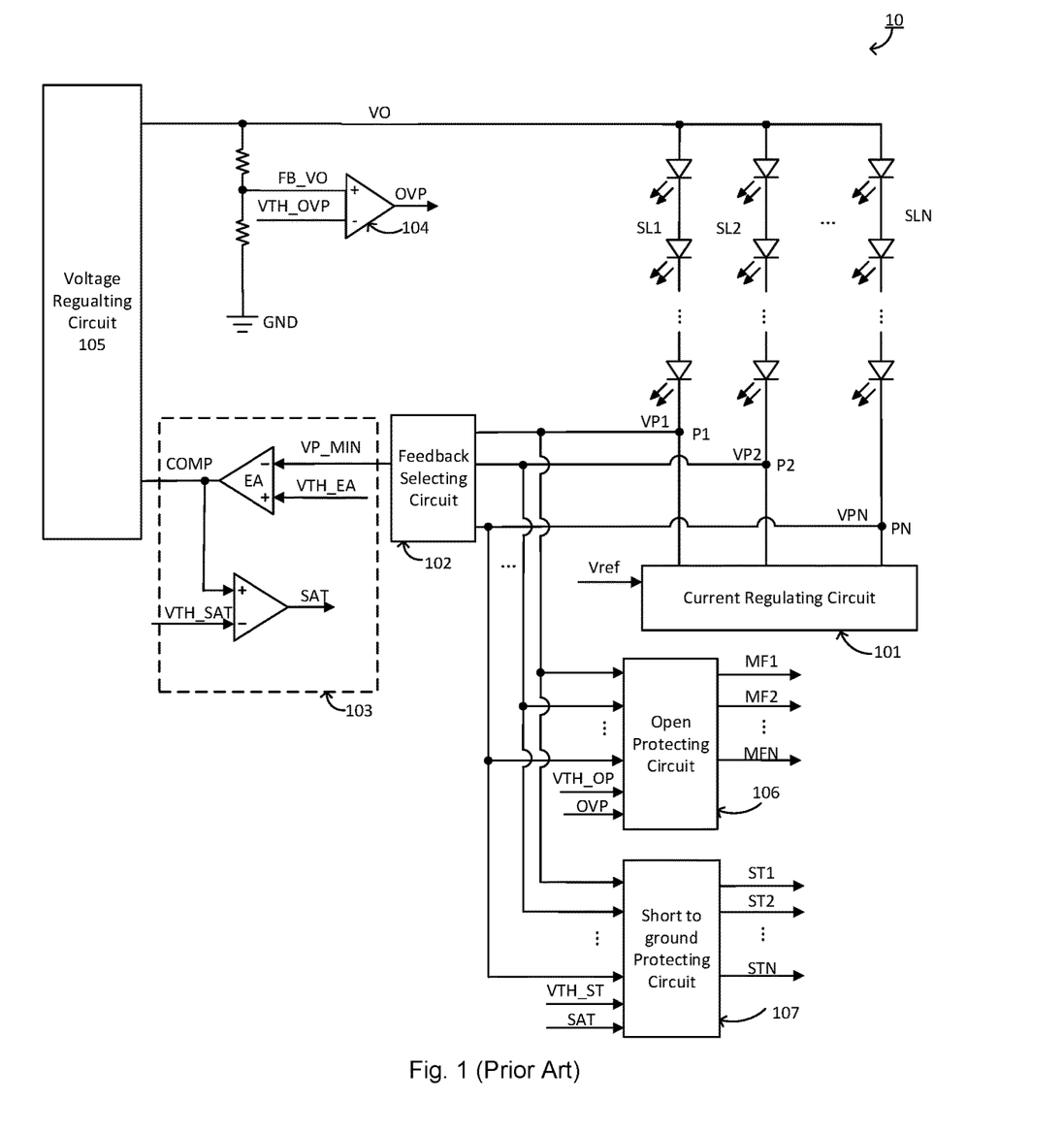
FIG. 1 illustrates a prior art LED driver 10.

FIG. 1 illustrates a prior art LED driver 10. The LED driver 10 has an output terminal to provide a power supply voltage VO for a plurality of LED strings SL1-SLN, and a plurality of feedback terminals P1-PN having a plurality of detecting voltages VP1-VPN, wherein N is the number of the LED strings and is an integer greater than or equal to 1. Wherein i is an integer in a range from 1 to N, for each i from 1 to N, the LED string SLi comprises multiple series arranged LEDs, and the feedback terminal Pi is coupled to the LED string SLi and has a corresponding detecting voltage VPi. The LED driver 10 comprises a current regulating circuit 101, a feedback selecting circuit 102, a saturation detecting circuit 103, an over voltage detecting circuit 104, a voltage regulating circuit 105, an open protecting circuit 106 and a short to ground protecting circuit 107. The current regulating circuit 101 is configured to regulate the current flowing through each of the plurality of LED strings SL1-SLN based on a received current regulating signal Vref. The feedback selecting circuit 102 is configured to couple to the plurality of feedback terminals P1-PN to receive the plurality of detecting voltages VP1-VPN, and to output a feedback voltage VP_MIN to the saturation detecting circuit 103, wherein the feedback voltage VP_MIN is the minimum one of the plurality of detecting voltages VP1-VPN. The saturation detecting circuit 103 is configured to generate an error signal COMP based on the difference between the feedback voltage VP_MIN and an error threshold voltage VTH_EA firstly, and then to generate a saturation signal SAT based on the comparison of the error signal COMP and a saturation threshold voltage VTH_SAT. The over voltage detecting circuit 104 is configured to receive an over voltage threshold voltage VTH_OVP and an output feedback voltage FB_VO indicative of the power supply voltage VO, and to generate an over voltage protecting signal OVP by comparing the output feedback voltage FB_VO with the over voltage threshold voltage VTH_OVP. The voltage regulating circuit 105 having a voltage control loop is configured to regulate the power supply voltage VO based on the feedback voltage VP_MIN. The open protecting circuit 106 is configured to receive the plurality of detecting voltages VP1-VPN, an open threshold voltage VTH_OP and the over voltage protecting signal OVP, and to generate a plurality of open fault signals MF1-MFN based on the plurality of detecting voltages VP1-VPN, the open threshold voltage VTH_OP and the over voltage protecting signal OVP. The short to ground protecting circuit 107 is configured to receive the plurality of detecting voltages VP1-VPN, a short threshold voltage VTH_ST and the saturation protecting signal SAT, and to generate a plurality of short indicating signals ST1-STN.

Figure 2:
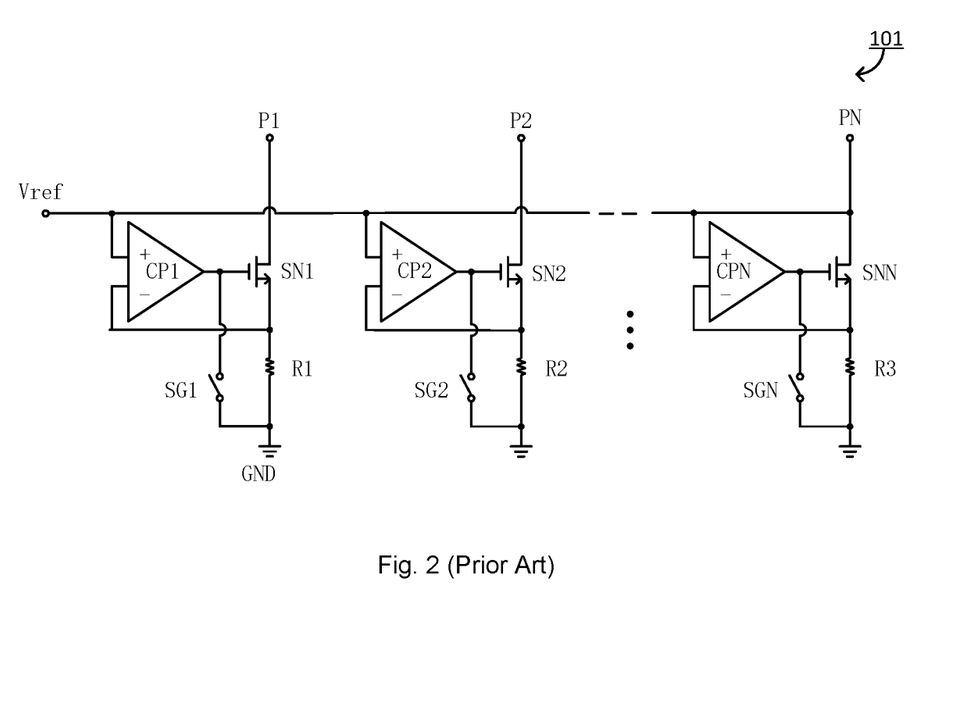
FIG. 2 illustrates an exemplary circuit diagram of the current regulating circuit 101 shown in FIG. 1.

FIG. 2 illustrates an exemplary circuit diagram of the current regulating circuit 101 shown in FIG. 1. As shown in FIG. 2, the current regulating circuit 101 comprises a plurality of control units configured to control the currents passing through the plurality of LED strings SL1-SLN, wherein N is the number of the LED strings and is an integer greater than or equal to 1. Each control unit comprises a current control switch SNi, a resistor Ri, a current isolating switch SGi and an amplifier CPi connected as FIG. 2. And for each i from 1 to N, the amplifier CPi is configured to regulate the current flowing through the corresponding LED string SLi based on the current regulating signal Vref.

The open protecting mechanism and short to ground protecting mechanism of the LED driver 10 will be described in reference with FIG. 1 and FIG. 2. When the LED string SLi (i is from 1 to N) has an open fault, the detecting voltage VPi will be near zero for the current control switch SNi is still controlled to be turned on, and the detecting voltage VPi will be selected by the feedback selecting circuit 102 as the feedback voltage VP_MIN to regulate the power supply voltage VO. Considering when the feedback voltage VP_MIN decreases, the power supply voltage VO increases, vice versa, so when the feedback voltage VP_MIN decreases to be near zero, the power supply voltage VO is regulated to increase to a high value, i.e., the output feedback voltage FB_VO indicative of the power supply voltage VO is regulated to increase to above an over voltage threshold voltage VTH_OV and thus the over voltage protection would be triggered. As a result, the voltage regulating circuit 101 is controlled to stop working until the output feedback voltage FB_VO decreases to below the over voltage threshold voltage VTH_OV. Meanwhile, if the detecting voltage VPi of the open LED string SLi is detected being lower than the open threshold voltage VTH_OP, the open fault signal MFi is valid. Usually, when the open fault signal MFi is valid, the associated open LED string SLi is controlled to be isolated from the LED driver 10.

When the LED string SLi (i is from 1 to N) has a short to ground fault, the feedback voltage VP_MIN would be the value of zero, and the power supply voltage VO is regulated to increase to trigger the over voltage protection also, thus an open fault protection may be mis-triggered, so it is easy to midjudge the short to ground fault to be the open fault, and there is a need to provide a short to ground and open protecting circuit that can identify the short to ground fault from the open fault.

Figure 3:
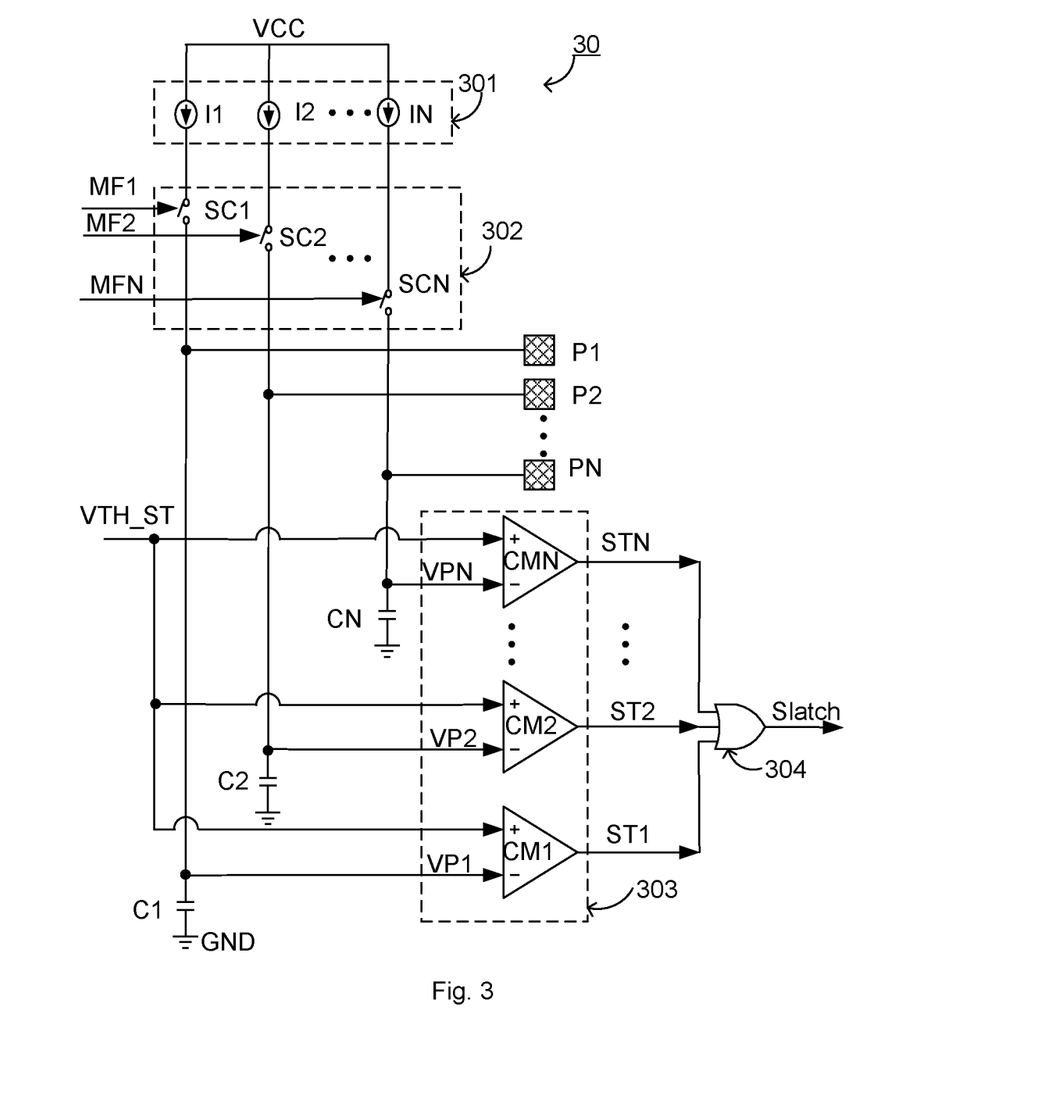
FIG. 3 illustrates an exemplary circuit diagram of a short to ground protecting circuit 30 in accordance with an embodiment of the present invention.

FIG. 3 illustrates an exemplary circuit diagram of a short to ground protecting circuit 30 in accordance with an embodiment of the present invention. The short to ground protecting circuit 30 is configured to use in an LED driver which has an output terminal to drive a plurality of LED strings (the plurality of LED strings SL1-SLN are not shown in FIG. 3 for brevity) and a plurality of feedback terminals P1-PN with a plurality of detecting voltages VP1-VPN, wherein N is the number of the LED strings and is an integer greater than or equal to 1. Wherein i is an integer in a range from 1 to N, for each i from 1 to N, the feedback terminal Pi is coupled to the LED string SLi and has a detecting voltage VPi. As the exemplary embodiment shown in FIG. 3, the short to ground protecting circuit 30 may comprise a plurality of comparison capacitors C1-CN coupled to the plurality of feedback terminals P1-PN, a current source module 301 comprising a plurality of current sources I1-1N, a charging switch module 302 comprising a plurality of charging switches SC1-SCN, and a short comparing module 303 comprising a plurality of short comparing units CM1-CMN. The plurality of current sources I1-IN may be configured to provide a plurality of currents for charging the plurality of comparison capacitors C1-CN respectively. For the plurality of charging switches SC1-SCN, the charging switch SCi (i is from 1 to N) is coupled between the comparison capacitor Ci and the current source Ii, and is controlled to be turned on or off by the open fault signal MFi. The short comparing module 303 is configured to receive the plurality of detecting voltages VP1-VPN and a short threshold voltage VTH_ST, and to output a plurality of short indicating signals ST1-STN. For the plurality of short comparing units CM1-CMN, the short comparing unit CMi (i is from 1 to N) has a first input terminal coupled to the feedback terminal Pi and the comparison capacitor Ci to receive the detecting the voltage VPi, a second input terminal configured to receive the short threshold voltage VTH_ST, and an output terminal configured to generate the short indicating signal STi based on the detecting voltage VPi and the short threshold voltage VTH_ST. In an embodiment, the comparison capacitor Ci (i is from 1 to N) is a parasitic capacitor between the feedback terminal Pi and the reference ground and the short threshold voltage VTH_ST is designed according to a specific application. In an embodiment, the short threshold voltage VTH_ST is 100 mV to 500 mV. In another embodiment, the short threshold voltage VTH_ST is 160 mV. It should be understand that, when the open fault signal MFi is valid, the short comparing unit CMi is enabled, and when the open fault signal MFi is invalid, the short comparing unit CMi is disabled.

Still referring to FIG. 3 to illustrate the working principle of the short to ground circuit 30. When the open fault signal MFi (i is from 1 to N, N is the number of the LED strings and is an integer greater than or equal to 1) is valid, the charging switch SCi is controlled to be turned on, the current source Ii is controlled to charge the comparison capacitor Ci. Comparing the detecting voltage VPi with the short threshold voltage VTH_ST after a preset time period TS of charging, and if the detecting voltage VPi is less than the short threshold voltage VTH_ST, the short indicating signal STi is valid to trigger the short protection. In an embodiment, when the short protection is triggered, the LED driver is controlled to stop working. In an embodiment, the preset time period TS is 50 us to 200 us. In another embodiment, the preset time period TS is 100 us. In an embodiment, the current provided by the current source Ii (i is from 1 to N) is determined by the comparison capacitor Ci, the short threshold voltage VTH_ST and the preset time period TS. In an embodiment, the current provided by the current source Ii (i is from 1 to N) is increased with increase of the comparison capacitor Ci. In another embodiment, the current provided by the current source Ii (i is from 1 to N) is increased with increase of the short threshold voltage VTH_ST.

The short to ground protecting circuit 30 may further comprise a short logic circuit 304. The short logic circuit 304 may be configured to receive the plurality of short indicating signals ST1-STN, and to generate a short fault signal Slatch to control the LED driver based on the plurality of short indicating signals ST1-STN, wherein N is the number of the LED strings and is an integer greater than or equal to 1. When the short indicating signal STi (i is from 1 to N) is valid, the short fault signal Slatch is valid to trigger the short protection.

Figure 4:
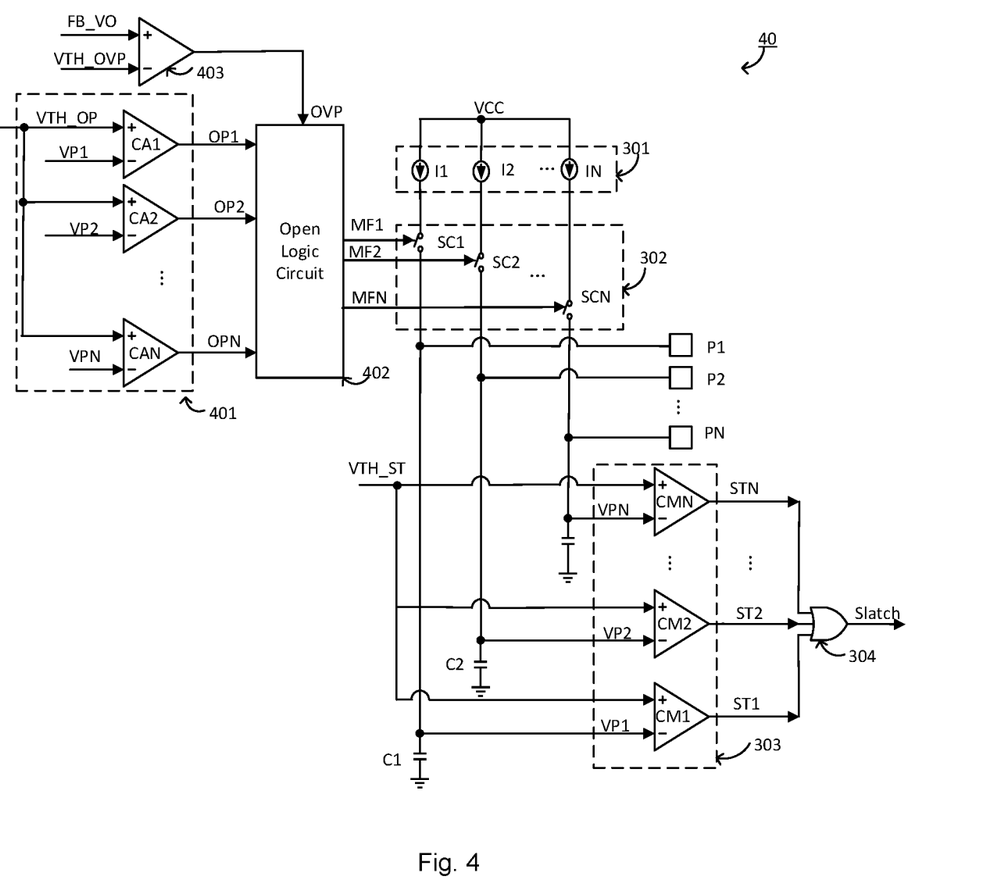
FIG. 4 illustrates an exemplary circuit diagram of a short to ground and open protecting circuit 40 used in an LED driver in accordance with an embodiment of the present invention.

FIG. 4 illustrates an exemplary circuit diagram of a short to ground and open protecting circuit 40 used in an LED driver in accordance with an embodiment of the present invention. Except the short to ground protecting circuit 30, the short to ground and open protecting circuit 40 may further comprise an open comparing circuit 401 and an open logic circuit 402. The open comparing circuit 401 is configured to receive the plurality of detecting voltages VP1-VPN and an open threshold voltage VTH_OP, and to generate a plurality of open indicating signals OP1-OPN by comparing the plurality of detecting voltages VP1-VPN with the open threshold voltage VTH_OP, wherein N is the number of the LED strings and is an integer greater than or equal to 1. In specific, the open indicating signal OPi (i is from 1 to N) is generated by comparing the detecting voltage VPi with the open threshold voltage VTH_OP. In an exemplary embodiment shown in FIG. 4, the open comparing circuit 401 may comprise a plurality of open comparing units CA1-CAN, wherein the open comparing unit CAi (i is from 1 to N) has a first input terminal to receive the detecting voltage VPi, a second input terminal to receive the open threshold voltage VTH_OP, and generates the open indicating signal OPi based on the comparison of the detecting voltage VPi and the open threshold voltage VTH_OP. In an embodiment, the open threshold voltage VTH_OP is 80-400 mV. In another embodiment, the open threshold voltage VTH_OP is 100 mV. The open logic circuit 402 is configured to receive the plurality of open indicating signals OP1-OPN and an over voltage protecting signal OVP, and to generate a plurality of open fault signals MF1-MFN base on a logic operating of the plurality of open indicating signals OP1-OPN and the over voltage protecting signal OVP. The work mechanism of the open logic circuit 402 is that, when the open indicating signal OPi and the over voltage protecting signal OVP are valid, the open fault signal MFi is valid. For the open protecting circuit 40 shown in FIG. 4, when the LED string SLi (i is from 1 to N) has an open fault, the detecting voltage VPi will be smaller than the open threshold voltage VTH_OP, the open indicating signal OPi is valid, then the open fault signal MFi is valid on the premise of the over voltage protecting signal OVP being valid, and the corresponding LED string SLi is controlled to be isolated from the LED driver. It should be known that, when the open fault signal MFi (i is from 1 to N) is valid, the charging switch SCi is also controlled to be turned on, and the short comparing unit CMi is enabled.

In the exemplary embodiment shown in FIG. 4, the over voltage protecting signal OVP is generated by an over voltage detecting circuit 403. The over voltage detecting circuit 403 is configured to receive the over voltage threshold voltage VTH_OVP and an output feedback voltage FB_VO indicative of a power supply voltage VO provided by the LED driver, and to generate the over voltage protecting signal OVP based on the over voltage threshold voltage VTH_OVP and the output feedback voltage FB_VO. When the output feedback voltage FB_VO is higher than the over voltage threshold voltage VTH_OVP, the over voltage protecting signal OVP will be valid to trigger the over voltage protection. In an embodiment, when the over voltage protection is triggered, the LED driver is controlled to stop working.

Figure 5:
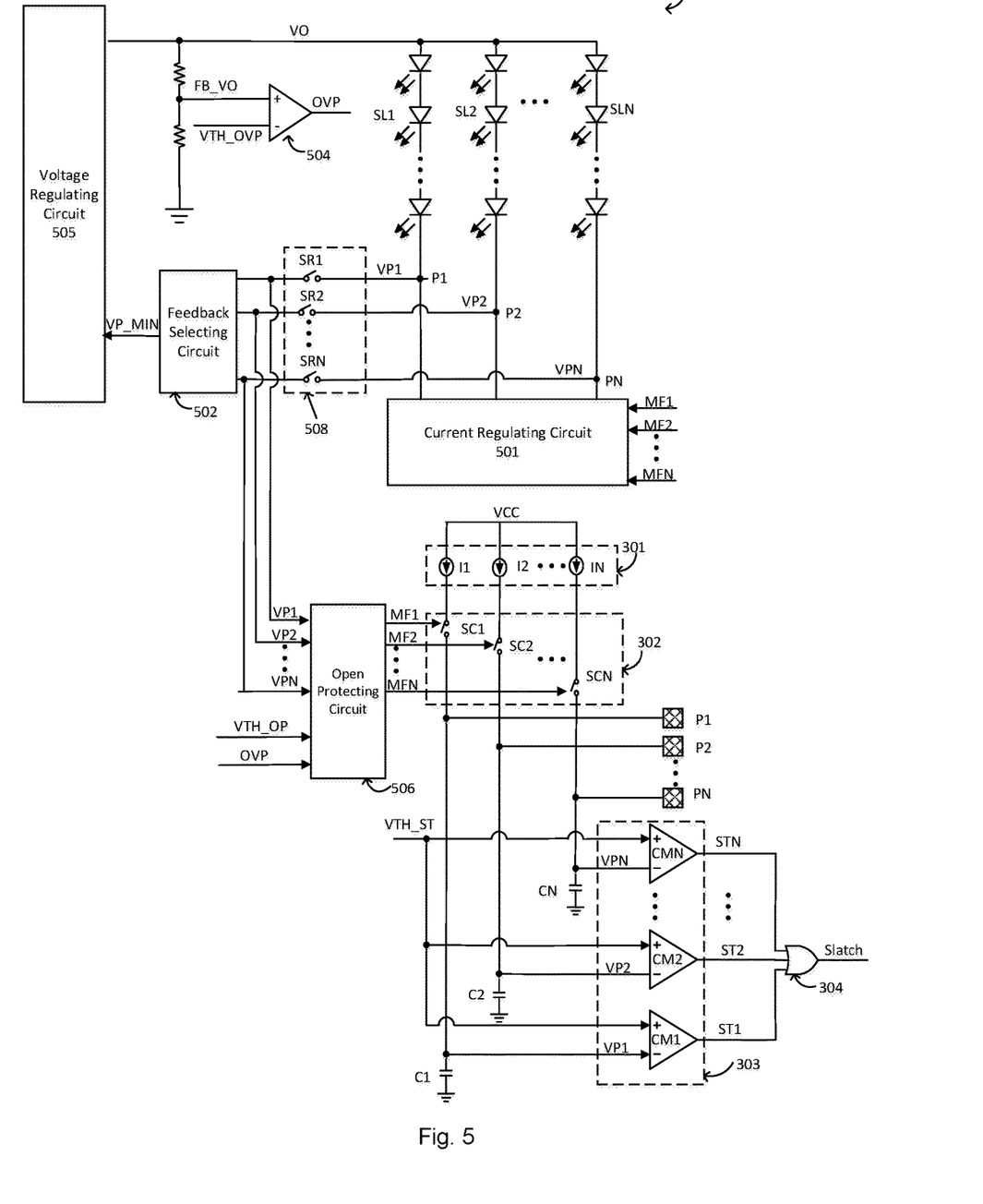
FIG. 5 illustrates an exemplary circuit diagram of an LED driver 50 for driving a plurality of LED strings SL1-SLN in accordance with an embodiment of the present invention.

FIG. 5 illustrates an exemplary circuit diagram of an LED driver 50 for driving a plurality of LED strings SL1-SLN in accordance with an embodiment of the present invention, wherein N is the number of the LED strings and is an integer greater than or equal to 1. As shown in FIG. 5, Wherein i is an integer in a range from 1 to N, for each i from 1 to N, the LED string has a first terminal and a second terminal, and is comprised by multiple series arranged LEDs. The LED driver 50 may have an output terminal and a plurality of feedback terminals P1-PN, wherein the output terminal is configured to couple to the first terminals of the plurality of LED strings SL1-SLN for providing a power supply voltage VO, and the feedback terminal Pi (i is from 1 to N) is configured to couple to the LED string SLi. The LED driver 50 may comprise a current regulating circuit 501, a feedback selecting circuit 502, an over voltage detecting circuit 504, a voltage regulating circuit 505, an open protecting circuit 506 and a short to ground protecting circuit. The current regulating circuit 505 coupled to the plurality of feedback terminals P1-PN is configured to regulate the currents flowing through the plurality of LED strings SL1-SLN. The feedback selecting circuit 502 coupled to the plurality of feedback terminals P1-PN is configured to receive the plurality of detecting voltages VP1-VPN, and to output a feedback voltage VP_MIN to the voltage regulating circuit 505, wherein the feedback voltage VP_MIN is the minimum one of the plurality of detecting voltages VP1-VPN. In the exemplary embodiment shown in FIG. 5, if the current regulating circuit 501 adopts the current regulating circuit 101 shown in FIG. 2, the comparison capacitor Ci (i is from 1 to N) is the parasitic capacitor of the current regulating switch SNi. Specifically, if the current regulating switch SNi is a MOSFET, the comparison capacitor Ci (i is from 1 to N) may comprise a parasitic capacitor between the drain terminal and source terminal, a parasitic capacitor between the drain terminal and gate terminal and a parasitic capacitor between the drain terminal and the substrate of the MOSFET. As described above, the current regulating circuit 501 may adopt the current regulating circuit 101 shown in FIG. 2, so the detailed schematic structure of the current regulating circuit 501 is not shown again for the sake of brevity. The voltage regulating circuit 505 has a voltage control loop and is configured to regulate the power supply voltage VO based on the feedback voltage VP_MIN. In an embodiment, the voltage regulating circuit 505 may comprise a buck. In another embodiment, the voltage regulating circuit 505 may comprise a boost or a fly-back.

The LED driver 50 may further comprise a feedback isolating circuit 508 comprising a plurality of voltage isolating switches SR1-SRN. The plurality of voltage isolating switches SR1-SRN is in ON state to transfer the plurality of detecting voltages VP1-VPN to the feedback selecting circuit 502 when there is no open fault or no short to ground fault, wherein N is the number of the LED strings and is an integer greater than or equal to 1.

The open protecting circuit 506 may be configured to receive the plurality of detecting voltages VP1-VPN, the open threshold voltage VTH_OP and an over voltage protecting signal OVP, and to generate a plurality of open fault signals MFI-MFN based on the plurality of detecting voltages VP1-VPN, the open threshold voltage VTH_OP and the over voltage protecting signal OVP. In the exemplary embodiment shown in FIG. 5, the open protecting circuit 506 may adopt the open protecting circuit shown in FIG. 4, thus the specific circuit diagram of the open protecting circuit 506 is not be described again for the sake of brevity. When the LED string SLi (i is from 1 to N) is open, the corresponding open fault signal MFi is valid to trigger the open protection. In an embodiment, when the open protection is triggered, the corresponding LED string SLi to controlled to be isolated from the LED driver 50. In an embodiment, the isolating of the faulted LED string SLi (i is from 1 to N) from the LED driver 50 is realized by disconnecting the detecting voltage VPi from the feedback selecting circuit 502. In another embodiment, the isolating of the faulted LED string SLi (i is from 1 to N) from the LED driver 50 is realized by disconnecting corresponding LED string SLi from the current regulating circuit 501. In the exemplary embodiment shown in FIG. 5, when the open fault signal MFi (i is from 1 to N) is valid, the voltage isolating switch SRi and the current isolating switch SGi in the current regulating circuit 501 are controlled to be turned off.

The LED driver 50 may further comprise a short to ground protecting circuit comprising a plurality of comparison capacitors C1-CN, a current source module 301, a charging switch module 302 and a short comparing module 303 as shown in FIG. 5. The plurality of comparison capacitors C1-CN are coupled to the plurality of feedback terminals P1-PN respectively, i.e., the comparison capacitor Ci (i is from 1 to N) is coupled to the feedback terminal Pi. In an embodiment, the comparison capacitor Ci is the parasitic capacitor between the feedback terminal Pi and the reference ground. In an embodiment, the comparison capacitor Ci is the total capacitor between the feedback terminal Pi and the reference ground. The current source module 301 may comprise a plurality of current sources I1-IN configured to provide a plurality of currents for the plurality of comparison capacitors C1-CN, i.e., the current source Ii (i is from 1 to N) is configured to provide a current for the comparison capacitor Ci. The charging switch module 302 may comprise a plurality of charging switches SC1-SCN which are controlled by the plurality of open fault signals MFI-MFN, wherein the charging switch SCi (i is from 1 to N) is coupled between the current source Ii and the comparison capacitor Ci. When the open fault signal MFi (i is from 1 to N) is valid, the charging switch SCi is controlled to be turned on, and the current source Ii is controlled to charge the comparison capacitor Ci. The short comparing module 303 is configured to receive the plurality of detecting voltages VP1-VPN and the short threshold voltage VTH_ST, and to generate the plurality of short indicating signals ST1-STN based on the comparison of the plurality of detecting voltages VP1-VPN and the short threshold voltage VTH_ST respectively. In the exemplary embodiment shown in FIG. 5, the short comparing module 303 may comprise a plurality of short comparing units CM1-CMN, wherein the short comparing unit CMi (i is from 1 to N) has a first input terminal coupled to the feedback terminal Pi and the comparison capacitor Ci, a second input terminal to receive the short threshold voltage VTH_ST, and is configured to generate the short indicating signal STi by comparing the detecting voltage VPi with the short threshold voltage VTH_ST. In an embodiment, the short threshold voltage VTH_ST is determined by the specific application. In an embodiment, the short threshold voltage VTH_ST is from 100 mV to 500 mV. In another embodiment, the short threshold voltage VTH_ST is 160 mV. It should be noted that, when the open fault signal MFi (i is from 1 to N) is valid, the short comparing unit CMi is enabled, while when the open fault signal MFi is invalid, the short comparing unit CMi is disabled. For the short to ground protecting circuit, when the open fault signal MFi is valid, the charging switch SCi is controlled to be turned on and the current source Ii is controlled to charge the comparison capacitor Ci, the detecting voltage VPi is compared with the short threshold voltage VTH_ST by the short comparing unit CMi. And if the detecting voltage VPi is less than the short threshold voltage VTH_ST after a preset time period TS of charging, the short indicating signal STi is valid to trigger the short protection. In an embodiment, when the short protection is triggered, the LED driver 50 is controlled to stop working. In an embodiment, the preset time period TS may be from 50 us to 200 us. In another embodiment, the preset time period TS may be 100 us. It should be noted that, the current provided by the current source Ii (i is from 1 to N) is related with the comparison capacitor Ci, the short threshold voltage VTH_ST and the preset time period TS. In an embodiment, the current provided by the current source Ii is increased with increase of the comparison capacitor Ci. In an embodiment, the current provided by the current source Ii is increased with increase of the short threshold voltage VTH_ST.

The short to ground circuit may further comprise a short logic circuit 304. The short logic circuit 304 is configured to receive the plurality of short indicating signals ST1-STN, and to generate the short fault signal Slatch to control the LED driver based on the logic operating of the short indicating signals ST1-STN, wherein N is the number of the LED strings and is an integer greater than or equal to 1. When the short indicating signal STi (i is from 1 to N) is valid, the short fault signal Slatch is valid to trigger the short protection. In an embodiment, when the short protection is triggered, the LED driver is controlled to stop working. In an embodiment, the short logic circuit 304 is an OR gate with a plurality of input terminals, the short fault signal Slatch is generated by performing the OR operation to the plurality of short indicating signals ST1-STN.

Figure 6:
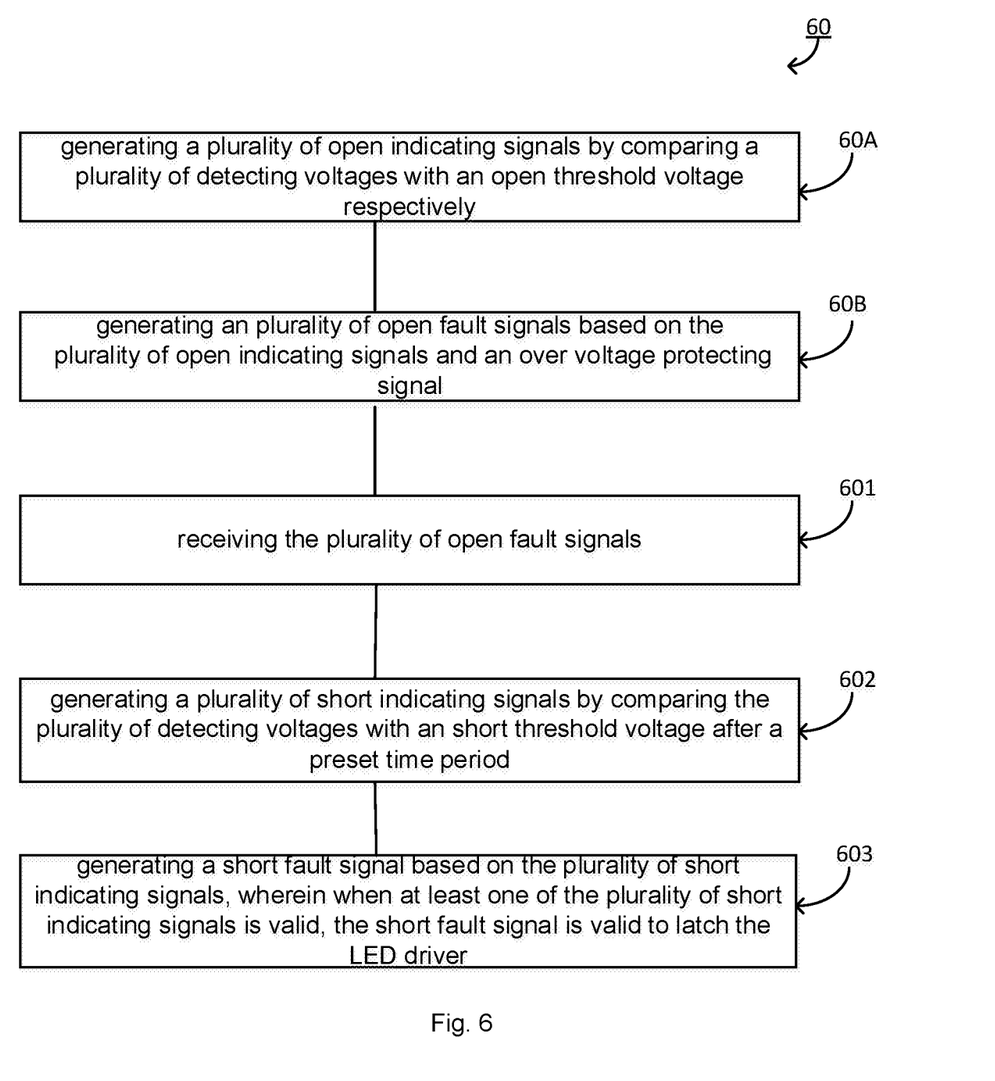
FIG. 6 illustrates a short to ground and open protecting method 60 in accordance with an embodiment of this invention.

FIG. 6 illustrates a short to ground and open protecting method 60 in accordance with an embodiment of this invention. The short to ground and open protecting method 60 will be described in reference with the LED driver 50 shown in FIG. 5, wherein the voltage regulating circuit 505 is configured to provide the power supply voltage VO to the plurality of LED strings SL1-SLN, N is the number of the LED strings and is an integer greater than or equal to 1. The short to ground and open protecting method 60 may comprise steps 601-603.

In step 601, receiving a plurality of open fault signals MF1-MFN, wherein when the open fault signal MFi (i is from 1 to N) is valid, the open protection is triggered. In an embodiment, when the open protection is triggered, the corresponding LED string SLi is controlled to be isolated from the LED driver 50.

In step 602, generating a plurality of short indicating signals ST1-STN by comparing a plurality of detecting voltages VP1-VPN with the short threshold voltage VTH_ST after a preset time period TS, wherein on the premise of the open fault signal MFi (i is from 1 to N) being valid, and if the detecting voltage VPi is less than the short threshold voltage VTH_ST after a preset time period TS of charging, the short indicating signal STi is valid to trigger the short protection.

And in step 603, generating a short fault signal Slatch based on the plurality of short indicating signals ST1-STN, wherein when the short indicating signal STi (i is from 1 to N) is valid, the short fault signal Slatch is valid to trigger the short protection.

In an embodiment, the preset time period TS is range from 50 us to 200 us. In another embodiment, the preset time period TS is 100 us.

In an embodiment, when the open protection is triggered, the faulted LED string is controlled to be isolated from the LED driver by disconnecting the corresponding detecting voltage from the feedback selecting circuit 502. In an embodiment, when the open protection is triggered, the faulted LED string is controlled to be isolated from the LED driver by disconnecting the corresponding detecting voltage from the current regulating circuit 501.

In an embodiment, when the short protection is triggered, the LED driver is controlled to stop working.

The short to ground and open protecting method 60 may further comprise steps 60A and 60B. In step 60A, generating a plurality of open indicating signals OP1-OPN by comparing the plurality of detecting voltages VP1-VPN with an open threshold voltage VTH_OP respectively, wherein N is the number of the LED strings and is an integer greater than or equal to 1. In step 60B, generating a plurality of open fault signals MFI-MFN based on the plurality of open indicating signals OP1-OPN and the over voltage protecting signal OVP, wherein on the premise of the over voltage protecting signal OVP being valid, when the open indicating signals OPi (i is from 1 to N) is valid, the open fault signal MFi is valid.

The advantages of the various embodiments of the short and open to ground protecting circuit is not confine to those described above. These and other advantage of the various embodiments of the present invention will become more apparent upon reading the whole detailed descriptions and studying the various figures of the drawings.

From the foregoing, it will be appreciated that specific embodiments of the present invention have been described herein for purposes of illustration, but that various modifications may be made without deviating from the technology. Many of the elements of one embodiment may be combined with other embodiments in addition to or in lieu of the elements of the other embodiments. Accordingly, the present invention is not limited except as by the appended claims.

What is claimed is:

1. A short to ground protecting circuit used in a light emitting diode (LED) driver for powering N LED strings, wherein the short to ground protecting circuit comprises a charging switch module having N input terminals to receive N open fault signals respectively, and a short comparing module configured to provide N short indicating signals, wherein N is an integer greater than or equal to 1, the LED driver has an output terminal for providing a power supply voltage for the N LED strings and N feedback terminals having N detecting voltages respectively, wherein i is an integer in a range from 1 to N, for each i from 1 to N, the $i^{th}$ LED string of the N LED strings is coupled between the output terminal and the $i^{th}$ feedback terminal of the N feedback terminals, and the $i^{th}$ feedback terminal is configured to have the $i^{th}$ detecting voltage of the N detecting voltages, wherein the short to ground protecting circuit is configured to receive a short threshold voltage and the N open fault signals, and to generate the N short indicating signals, and wherein when the $i^{th}$ open fault signal of the N open fault signals is valid, and if the $i^{th}$ detecting voltage is less than the short threshold voltage for a preset time period, the $i^{th}$ short indicating signal is valid.

2. The short to ground protecting circuit of claim 1, further comprising:
N comparison capacitors, wherein for each i from 1 to N, the $i^{th}$ comparison capacitor is coupled to the $i^{th}$ feedback terminal; and
N current sources, wherein for each i from 1 to N, the $i^{th}$ current source is configured to provide a current for charging the $i^{th}$ comparison capacitor;
wherein the charging switch module comprises N charging switches, and for each i from 1 to N, the $i^{th}$ charging switch is coupled between the $i^{th}$ current source and the $i^{th}$ comparison capacitor, and is controlled by the $i^{th}$ open fault signal;
wherein the short comparing module comprises N short comparing units, and for each i from 1 to N, the $i^{th}$ short comparing unit has a first input terminal coupled to the $i^{th}$ feedback terminal to receive the $i^{th}$ detecting voltage, a second input terminal to receive the short threshold voltage, and an output terminal to generate the $i^{th}$ short indicating signal by comparing the $i^{th}$ detecting voltage with the short threshold voltage; and
wherein for each i from 1 to N, when the $i^{th}$ open fault signal is valid, the $i^{th}$ charging switch is turned on, and the $i^{th}$ current source is configured to charge the $i^{th}$ comparison capacitor, and if the $i^{th}$ detecting voltage is less than the short threshold voltage after charging for the preset time period, the $i^{th}$ short indicating signal is valid.

3. The short to ground protecting circuit of claim 2, wherein the N comparison capacitors are parasitic capacitors.

4. The short to ground protecting circuit of claim 1, wherein for each i from 1 to N, when the $i^{th}$ LED string is open, the $i^{th}$ open fault signal is valid.

5. The short to ground protecting circuit of claim 1, wherein the preset time period is from 50 us to 200 us.

6. A short to ground and open protecting circuit used in a light emitting diode (LED) driver for powering N LED strings, wherein N is an integer greater than or equal to 1, the LED driver has an output terminal for providing a power supply voltage for the N LED strings and N feedback terminals having N detecting voltages respectively, wherein i is an integer in a range from 1 to N, for each i from 1 to N, the $i^{th}$ LED string of the N LED strings is coupled between the output terminal and the $i^{th}$ feedback terminal of the N feedback terminals, and the $i^{th}$ feedback terminal is configured to have the $i^{th}$ detecting voltage of the N detecting voltages, the short to ground and open protecting circuit comprising:
an open protecting circuit, configured to generate N open fault signals, wherein for each i from 1 to N, when the $i^{th}$ LED string is open, the $i^{th}$ open fault signal is valid; and
a short to ground protecting circuit, having N input terminals respectively coupled to the N feedback terminals to receive the N detecting voltages, configured to generate N short indicating signals based on the N detecting voltages, wherein for each i from 1 to N, on the premise of the $i^{th}$ open fault signal being valid, if the $i^{th}$ detecting voltage is less than a short threshold voltage for a preset time period, the $i^{th}$ short indicating signal is valid.

7. The short to ground and open protecting circuit of claim 6, wherein the open protecting circuit comprises:
an open comparing circuit, having N input terminals respectively coupled to the N feedback terminals to receive the N detecting voltages, configured to generate N open indicating signals based on the N detecting voltages, wherein for each i from 1 to N, the $i^{th}$ open indicating signal is generated by comparing the $i^{th}$ detecting voltage with an open threshold voltage; and
an open logic circuit, having N input terminals to receive the N open indicating signals, and configured to generate the N open fault signals based on the N open indicating signals and an over voltage protecting signal, wherein for each i from 1 to N, when the over voltage protecting signal and the $i^{th}$ open indicating signal are valid, the $i^{th}$ open fault signal is valid.

8. The short to ground and open protecting circuit of claim 7, wherein when an output feedback voltage indicative of the power supply voltage is higher than an over voltage threshold voltage, the over voltage protecting signal is valid.

9. The short to ground and open protecting circuit of claim 6, wherein the short to ground protecting circuit comprises:
N comparison capacitors, wherein for each i from 1 to N, the $i^{th}$ comparison capacitor is coupled to the $i^{th}$ feedback terminal;
N current sources, wherein for each i from 1 to N, the $i^{th}$ current source is configured to provide a current for charging the $i^{th}$ comparison capacitor;
a charging switch module, having N input terminals to receive the N open fault signals respectively, wherein the charging switch module comprises N charging switches, and for each i from 1 to N, the $i^{th}$ charging switch is coupled between the $i^{th}$ current source and the $i^{th}$ comparison capacitor, and is controlled by the $i^{th}$ open fault signal; and
a short comparing module, configured to provide N short indicating signals, wherein the short comparing module comprises N short comparing units, and for each i from 1 to N, the $i^{th}$ short comparing unit has a first input terminal coupled to the i$^{th}$ feedback terminal to receive the i$^{th}$ detecting voltage, a second input terminal to receive the short threshold voltage, and an output terminal to generate the i$^{th}$ short indicating signal by comparing the i$^{th}$ detecting voltage with the short threshold voltage;

wherein for each i from 1 to N, when the i$^{th}$ open fault signal is valid, the i$^{th}$ charging switch is turned on, and the i$^{th}$ current source is configured to charge the i$^{th}$ comparison capacitor, and if the i$^{th}$ detecting voltage is less than the short threshold voltage for the preset time period, the i$^{th}$ short indicating signal is valid.

10. The short to ground and open protecting circuit of claim 9, wherein the short to ground protecting circuit further comprises a short logic circuit configured to provide a short fault signal based on the N short indicating signals, wherein when any one of the short indicating signals is valid, the short fault signal is valid.

11. The short to ground and open protecting circuit of claim 9, wherein the N comparison capacitors are parasitic capacitors.

12. A light emitting diode (LED) driver for powering N LED strings, wherein N is an integer greater than or equal to 1, the LED driver has an output terminal and N feedback terminals having N detecting voltages respectively, wherein i is an integer in a range from 1 to N, for each i from 1 to N, the i$^{th}$ LED string of the N LED strings is coupled between the output terminal and the i$^{th}$ feedback terminal of the N feedback terminals, and the i$^{th}$ feedback terminal is configured to have the i$^{th}$ detecting voltage of the N detecting voltages, the LED driver comprising:

a voltage regulating circuit, coupled to the output terminal to provide a power supply voltage for the N LED strings;

a current regulating circuit, coupled to the N LED strings and configured to regulate the currents flowing through the N LED strings based on a current regulating signal;

a feedback selecting circuit, having N input terminals respectively coupled to the N feedback terminals to receive the N detecting voltages, and configured to provide the minimum one of the N detecting voltages to the voltage regulating circuit to regulate the power supply voltage;

an open protecting circuit, configured to generate N open fault signals, wherein for each i from 1 to N, when the i$^{th}$ LED string is open, the i$^{th}$ LED fault signal is valid; and a short to ground protecting circuit, configured to receive a short threshold voltage and N open fault signals, and to generate N short indicating signals, wherein for each i from 1 to N, on the premise of the i$^{th}$ open fault signal being valid, if the i$^{th}$ detecting voltage is less than a short threshold voltage for a preset time period, the i$^{th}$ short indicating signal is valid.

13. The LED driver of claim 12, wherein the open protecting circuit comprises:

an open comparing circuit, configured to receive an open threshold voltage and the N detecting voltages, and to provide N open indicating signals, wherein for each i from 1 to N, the i$^{th}$ open indicating signal is generated by comparing the i$^{th}$ detecting voltage with the open threshold voltage; and an open logic circuit, configured to receive the N open indicating signals and an over voltage protecting signal, and to generate the N open fault signals, wherein for each i from 1 to N, when the over voltage protecting signal and the i$^{th}$ open indicating signal are valid, the i$^{th}$ open fault signal is valid.

14. The LED driver of claim 13, wherein when an output feedback voltage indicative of the power supply voltage is higher than an over voltage threshold voltage, the over voltage protecting signal is valid.

15. The LED driver of claim 12, wherein the short to ground protecting circuit comprises:

N comparison capacitors, wherein for each i from 1 to N, the i$^{th}$ comparison capacitor is coupled to the i$^{th}$ feedback terminal;

N current sources, wherein for each i from 1 to N, the i$^{th}$ current source is configured to provide a current for charging the i$^{th}$ comparison capacitor;

a charging switch module, having N input terminals to receive the N open fault signals respectively, wherein the charging switch module comprises N charging switches, and for each i from 1 to N, the i$^{th}$ charging switch is coupled between the i$^{th}$ current source and the i$^{th}$ comparison capacitor, and is controlled by the i$^{th}$ open fault signal; and a short comparing module, configured to provide the N short indicating signals, wherein the short comparing module comprises N short comparing units, and for each i from 1 to N, the i$^{th}$ short comparing unit has a first input terminal coupled to the i$^{th}$ feedback terminal to receive the i$^{th}$ detecting voltage, a second input terminal to receive the short threshold voltage, and an output terminal to generate the i$^{th}$ short indicating signal by comparing the i$^{th}$ detecting voltage with the short threshold voltage;

wherein for each i from 1 to N, when the i$^{th}$ open fault signal is valid, the i$^{th}$ charging switch is turned on, and the i$^{th}$ current source is configured to charge the i$^{th}$ comparison capacitor, and if the i$^{th}$ detecting voltage is less than the short threshold voltage for the preset time period, the i$^{th}$ short indicating signal is valid.

16. The LED driver of claim 15, the short to ground protecting circuit further comprises a short logic circuit configured to provide a short fault signal based on the N short indicating signals, wherein when any one of the short indicating signals is valid, the short fault signal is valid.

17. The LED driver of claim 15, wherein the N comparison capacitors are parasitic capacitors.

18. A short to ground and open protecting method used in a light emitting diode (LED) driver for powering N LED strings, wherein N is an integer greater than or equal to 1, the LED driver has an output terminal for providing a power supply voltage for the N LED strings and N feedback terminals having N detecting voltages respectively, wherein i is an integer in a range from 1 to N, for each i from 1 to N, the i$^{th}$ LED string of the N LED strings is coupled between the output terminal and the i$^{th}$ feedback terminal of the N feedback terminals, and the i$^{th}$ feedback terminal is configured to have the i$^{th}$ detecting voltage of the N detecting voltages, the short to ground and open protecting method comprising:

receiving N open fault signals, wherein for each i from 1 to N, the i$^{th}$ open fault signals is configured to indicate if the i$^{th}$ LED string is open, and generating N short indicating signals by comparing the N detecting voltages with a short threshold voltage respectively;

wherein for each i from 1 to N, on the premise of the i$^{th}$ open fault signal being valid, if the i$^{th}$ detecting voltage is less than the short threshold voltage for a preset time period, the $i^{th}$ short indicating signal is valid.

19. The short to ground and open protecting method of claim 18, wherein for each i from 1 to N, when the $i^{th}$ LED string is open, the $i^{th}$ open fault signal is valid.

20. The short to ground and open protecting method of claim 18, wherein the LED driver further comprises N comparison capacitors respectively coupled to the N feedback terminals, wherein for each i from 1 to N, the $i^{th}$ comparison capacitor is coupled to the $i^{th}$ feedback terminal, when the $i^{th}$ open fault signal is valid, the $i^{th}$ comparison capacitor is charged to generate the $i^{th}$ detecting voltage, and if the $i^{th}$ detecting voltage is less than the short threshold voltage for the preset time period, the $i^{th}$ short indicating signal is valid.

* * * * *